May 13, 1941. H. W. SANFORD 2,241,424
FURNACE HAVING AUTOMATIC FUEL CONTROL
Filed April 12, 1937 8 Sheets-Sheet 1

Inventor
HUGH W. SANFORD
Attorneys

May 13, 1941. H. W. SANFORD 2,241,424
FURNACE HAVING AUTOMATIC FUEL CONTROL
Filed April 12, 1937 8 Sheets-Sheet 4

Inventor
HUGH W. SANFORD
By Mason & Porter,
Attorneys

May 13, 1941.  H. W. SANFORD  2,241,424
FURNACE HAVING AUTOMATIC FUEL CONTROL
Filed April 12, 1937  8 Sheets-Sheet 6

Hugh W. Sanford

May 13, 1941.　　　　H. W. SANFORD　　　　2,241,424
FURNACE HAVING AUTOMATIC FUEL CONTROL
Filed April 12, 1937　　　8 Sheets-Sheet 7

Inventor
HUGH W. SANFORD

Patented May 13, 1941

2,241,424

UNITED STATES PATENT OFFICE 2,241,424

FURNACE HAVING AUTOMATIC FUEL CONTROL

Hugh W. Sanford, Knoxville, Tenn., assignor to Knox Stove Works, Knoxville, Tenn., a corporation of Tennessee Application April 12, 1937, Serial No. 136,492

27 Claims. (Cl. 110—101)

This invention relates to the art of providing automatic control for the supply of solid fuel to a combustion furnace.

One of the features of the present invention is the employment of the fuel present in a fire pot for regulating the feeding and advancement of the fuel into and through the fire zone.

Another feature of the present invention is the provision of a structure and a method of operation whereby the solid fuel, when present to a predetermined extent in the fire pot, is effective by congestion for restricting the movement of the structure for feeding and advancing the fuel.

A further feature of the present invention comprises the provision of a furnace structure having a grate and coordinated fuel feeding means including a pusher for effecting advancement of the fuel along the grate, the pusher being driven by a device which maintains substantially uniform torque or thrust effect.

A further feature of the present invention is the provision of a furnace structure having a grate, means for advancing fuel to and along said grate, and a discharge means for clinkers coordinately moved with the said feeding and advancing means.

A still further feature of the present invention comprises the provision of coordinated fuel feeding means, a furnace structure having a grate, and an oscillating pusher which is driven by means delivering substantially a uniform torque thereto, in association with means effective during a return movement of the oscillating member for supplying fuel at a point between the existing fire bed and the oscillating pusher in its withdrawn position.

Other features of the invention reside in details of the construction, and in the general assemblages of structures, and will appear more fully in conjunction with the following description of illustrative examples of practicing this invention.

In the drawings:

Figures 7, 8 and 9 show another form of construction: Fig. 7 being in upright longitudinal section similar to Fig. 1; while Figs. 8 and 9 are upright sections substantially on lines 8—8 and 9—9 of Fig. 7, respectively.

In these drawings, the invention is illustrated in conjunction with a small stove employed for heating water. This stove has an outer casing comprising the front wall 10, the rear wall 11, and the side walls 12 and 13. The upper part of this casing is constructed and arranged to provide a hopper for receiving the supply of fuel, and is normally closed by a cover 14. Within this upper portion of the casing are provided the hopper walls 15 having a bottom opening through and from which the coal is supplied to the furnace grate.

At the bottom of the furnace, the front wall is provided with a sealed ash pit door 16 to afford access for removal of the ash pan 17, which can be slid along the closing bottom wall 18.

Figure 2:
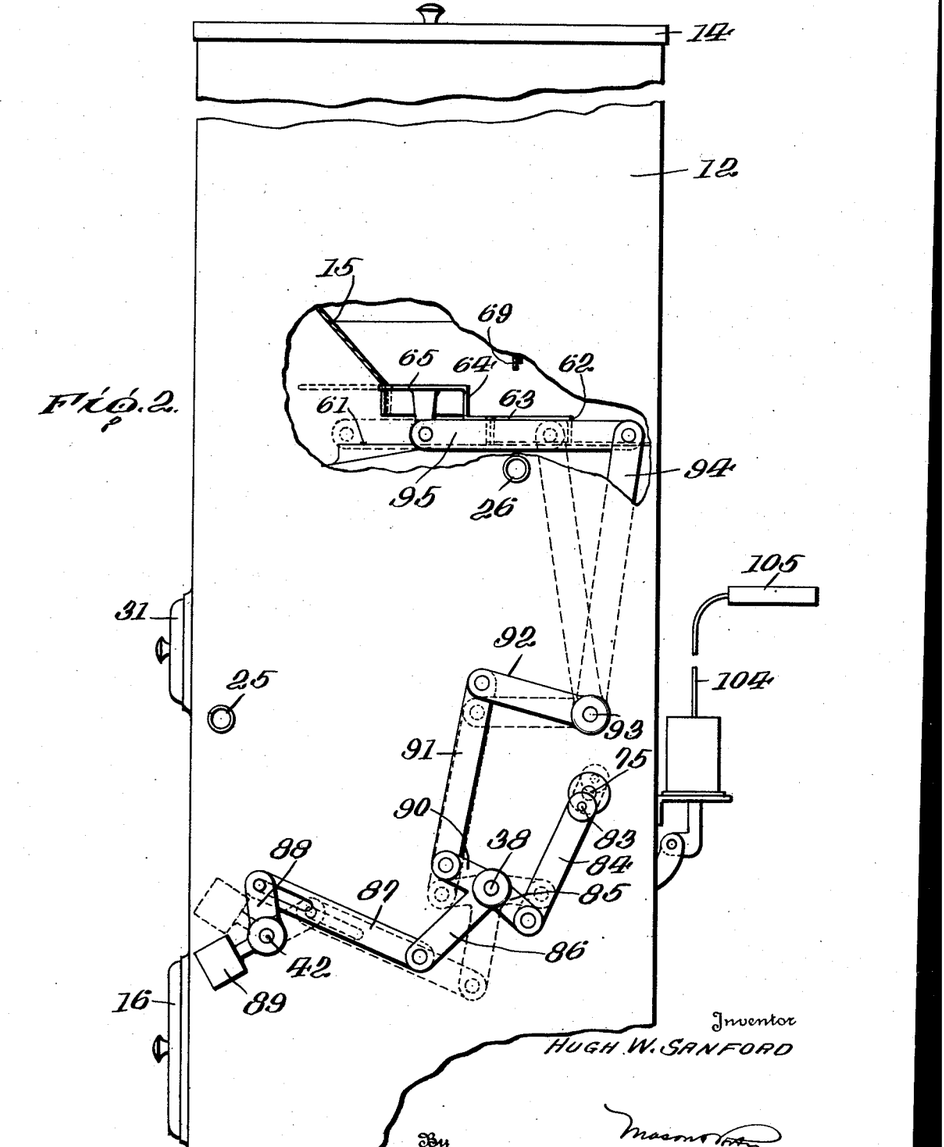
Figures 2 and 3 are elevations of opposite sides of the structure.
Figure 4:
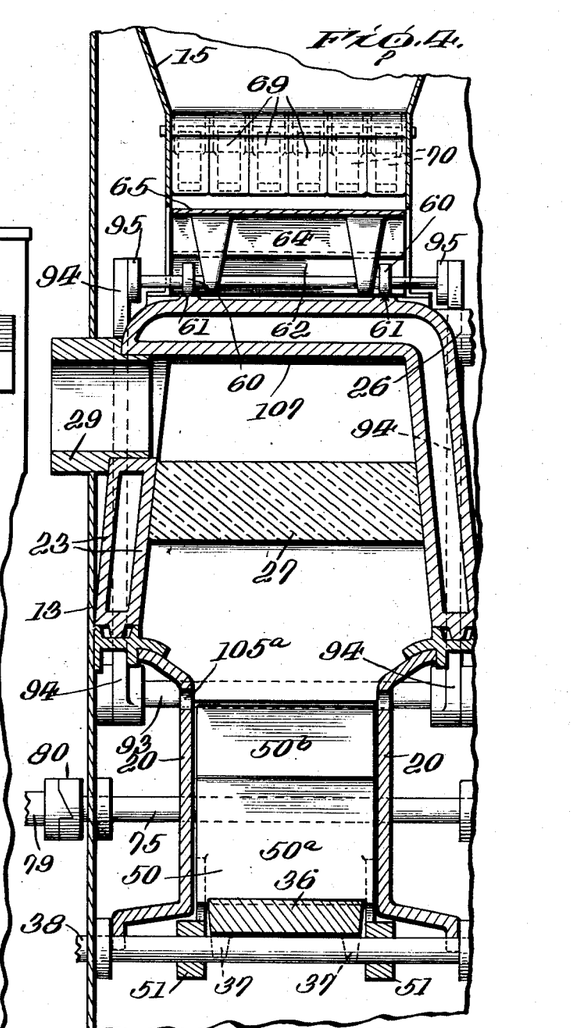
Figure 4 is an upright transverse section, at an enlarged scale, substantially on line 4—4 of Fig. 1.

The furnace structure proper, in this illustrative form, includes refractory side walls 20 and cast iron side walls 21, a refractory end wall 22 and a dome structure sealed to the fire pot walls, and comprising inner and outer walls 23 which define a water jacket having an appropriate water inlet connection 25 near its lowest point, and a water outlet connection 26 near its highest point (see Figs. 2 and 4). A refractory baffle 27 extends from side to side of the dome structure, with its front edge spaced from the front of the dome structure, and having its rear edge extending to a cross-wall 28 forming a part of the fuel delivery channel, as will be described hereinafter. A lateral opening extends from the interior of the dome structure at a point above the baffle 27 to provide an outlet flue 29 for combustion gases. The front of the dome structure preferably has an opening 30 which is normally closed by a sealing door 31; this door may be opened for inserting kindling in starting the furnace.

Figure 5:
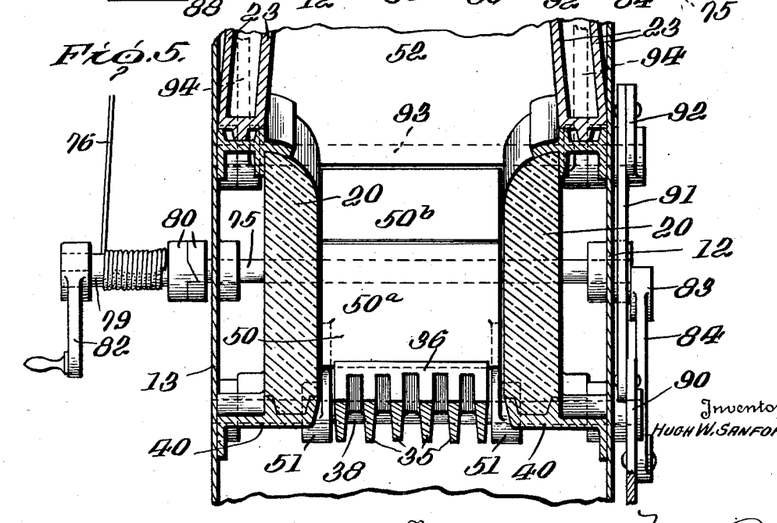
Figure 5 is a similar section, substantially on line 5—5 of Fig. 1.
Figure 6:
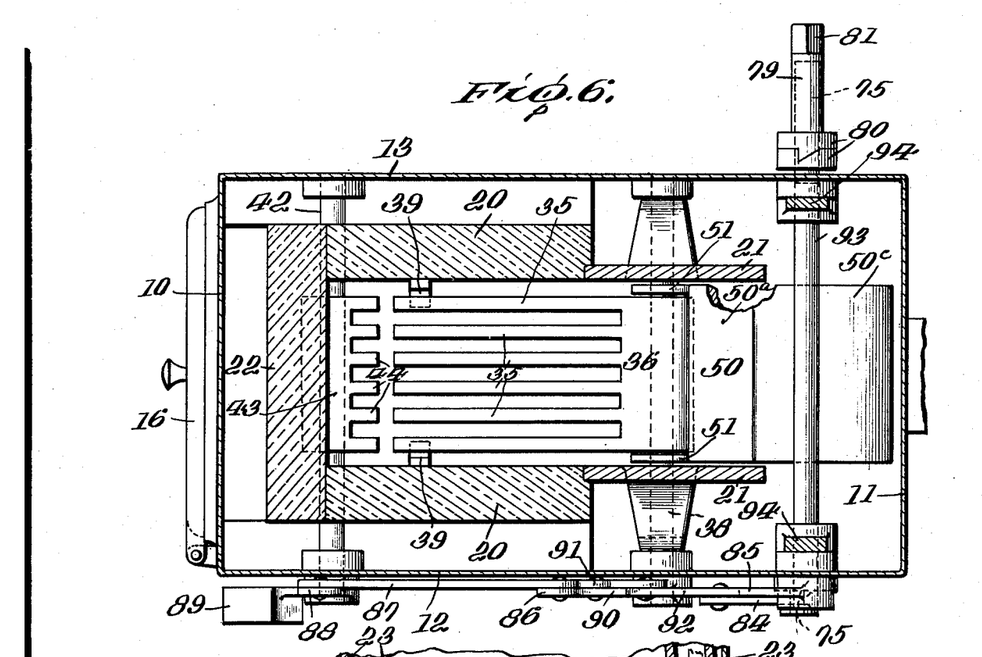
Figure 6 is a horizontal section, on the same scale, substantially on line 6—6 of Fig. 1.

The bottom of the fire pot receives a grate bar structure 35 which preferably is formed as an integral casting comprising the individual bars which extend parallel to the direction of advancement of fuel and clinkers through the fire pot, the bars being spaced apart and having their ends extending free so that clinkers may be easily stripped therefrom. At the feeding end, these individual fire bars are joined by the integral cross-web 36 which has the downwardly extending lugs 37 thereon for engaging around a transversely extending rod 38. At the lower or discharge end, in this illustrative form, the extreme lateral fire bars engage inwardly extending lugs 39 projecting from the members 40, 41 (Figs. 1, 5 and 6) which support the side walls 20, 21 at the lower edges of the latter. A further transverse rod 42 is connected to a dumping bar comprising the connection portion 43 and the individual fingers 44 which are preferably aligned with the fire bars (Fig. 6).

A pusher plate 50 is employed for advancing the fuel, ashes and clinkers into and through the combustion zone provided by the fire pot. This pusher plate 50 is formed with laterally projecting hollow lugs 51 which are received around and secured to the rod 38. The structure of the pusher plate 50 provides a lower surface 50a extending substantially radially from the axis of the rod 38 in this illustrated form, along with an upper surface 50b which is inclined at an angle to the surface 50a and is effective in the dotted line position of Fig. 1 to produce a relatively downward pressure upon adjacent material in the fire pot. The pusher plate also includes an arcuate top wall 50c which is always presented, in the various positions of the pusher plate, closely adjacent the lower edge of the wall 52 providing part of the fuel supply channel hereinafter referred to. The lower edge of the wall 50a extends very close to the upper surface of the cross-web 36, which provides a concentric surface with respect to the axis of rod 38, and thus to the path of movement of the pusher plate 50. It will be noted that the lower edge of the pusher plate 50 is beveled and at an angle relative to the said arcuate surface of the cross-web 36, to avoid clogging by pinching fine fuel therebetween.

The side walls 20 are located parallel to one another, in this form, and closely adjacent the edges of the pressure plate 50 (Fig. 6), also preferably being beveled.

The fuel supply channel comprises the aforesaid walls 28 and 52, and also lateral closing walls 55. The wall 52 terminates closely adjacent to and in substantial alignment with the pusher plate 50 when the latter is in a withdrawn position (full line, Fig. 1), so that fuel descending in the fuel channel is delivered immediately in front of the pusher plate 50 and relatively behind fuel material already present in the fire pot.

An illustrative form of automatic supply means for delivering fuel into the fuel channel is shown as comprising a feeding carriage mounted on the rollers 60 for travel along the top surface 61 of the dome. This carriage comprises a first upright pusher wall 62, a lower supporting wall 63, a second upright pusher wall 64, and an upper supporting wall 65. The upper supporting wall 65 closely engages the lower edges of a hopper wall 15. In the extreme right-hand position of the carriage, as shown in full lines in Fig. 1, the first upright or pusher wall 62 is presented closely adjacent the upper opening of the fuel supply channel. In the illustrated form, the right-hand hopper wall 15 in Fig. 1 terminates a relatively great distance above the surface of the supporting wall 65, and a pivot 68 receives a pivoted gate structure 69 which is normally held in a vertical position by the action of the weight means 70.

Figure 3:
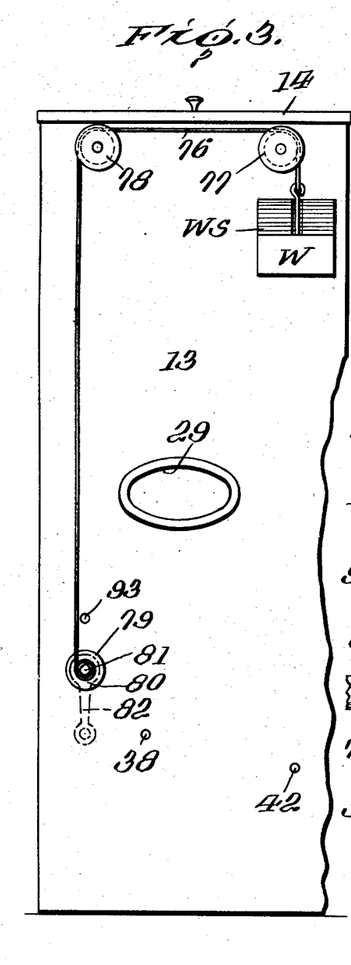

The structure is made effective by exerting, upon a shaft 75, a torque which preferably is substantially constant. In the illustrated form, this torque is produced by the action of a weight W which may be increased for regulation by the small supplemental weights Ws. A cable 76 extends over the pulleys 77 and 78 (Fig. 3) and engages around a drum 79 which is fixed to the shaft 75 (Figs. 3 and 5). This drum 79 is preferably formed for relative rotation above the axis of shaft 75, and has a clutch 80 for driving the shaft 75 under the urgency of the weight W. The drum 79 further is provided with a squared end 81 which may be engaged by a separable crank 82 for the purpose of rewinding the structure, under which conditions the clutch 80 permits the rewinding without rotative movement of the shaft 75.

The rotation of shaft 75, as shown in Fig. 2, causes the eccentric pin 83 to reciprocate the link 84 which is connected to the arm 85 of the lever which is fixed to the rod 38, and thereby produces successive oscillation movements of the pusher plate 50. The lever 85 is also connected with a further lever arm 86 which in turn is connected by a link 87 with a crank arm 88 fixed to the rod 42, so that the pusher plate 50 and the dumping gate structure 43 are moved in unison. A compensating weight 89 is preferably also fixed to the rod 42 to compensate for the weight of fuel upon the dumping structure 43, 44.

In this illustrative form, the lever arm 85 is also connected to a further arm 90 which is joined by a link 91 to a crank arm 92 on a rod 93 which is provided within the casing with a pair of arms 94 which extend upwardly at either side of the feed carriage and are connected thereto by the links 95.

Certain portions of the construction relative to the supply of fuel are disclosed and claimed in the copending application Serial No. 132,578, filed March 23, 1937, by William P. Biddle, Jr., and are set out herein as a form of the structures which may be employed for such purposes.

The operation of this structure is as follows:

A kindling fire may be built directly upon the fire bars 35, by opening the door 31 and inserting the necessary matter and igniting it. The hopper is assumed to contain a sufficient supply of coal, which may be of a commercial size such as chestnut. The crank 81 is employed to wind the windlass and raise the weight W. It is usually preferred to insert some coal directly upon the kindling, in the usual way, in starting the fire.

Figure 1:
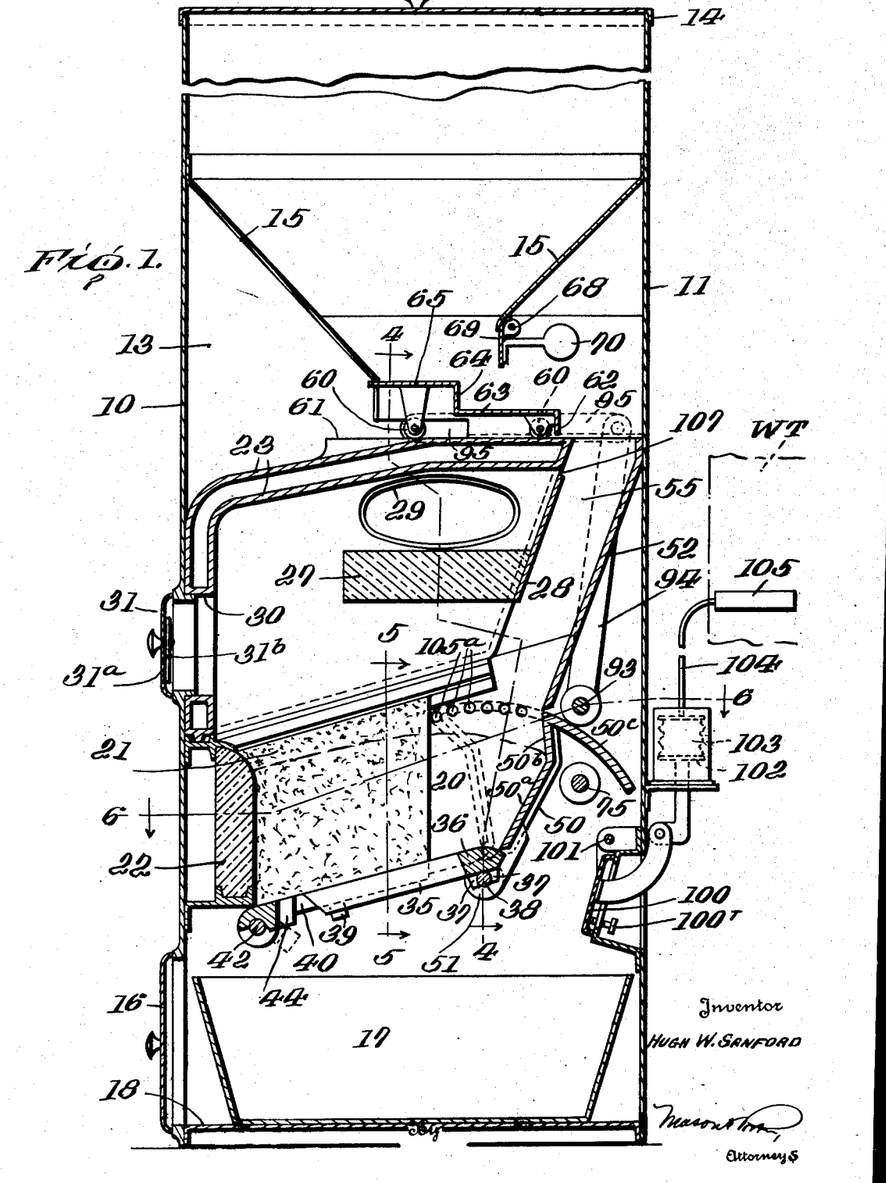
Figure 1 is an upright sectional view of a form of construction, substantially on line 1—1 of Fig. 2.

The weight W produces a torque on the shaft 75 tending to move the same in a clockwise direction in Fig. 3 and a counterclockwise direction in Figs. 1 and 2. Thus, a counterclockwise rocking effect (Fig. 2) is produced at the lever 85 tending to turn the rod 38 in a counterclockwise direction. As the contents of the fire pot burn away, the pressure plate 50 is permitted to rock under the torque effect at the rod 38. In proportion as the rod 38 is permitted to move, the lever 85 also moves, and therewith the arm 86 is rocked and link 87 pulled so that the rod 42 is rocking while the balance weight 89 is raised and the fingers 44 of the dumping section are moved toward the dotted line position of Fig. 1, thus permitting discharge of clinkers and ash particles of large size. At the same time, also, the link 91 is pulled downward and the arms 84 moved in a counterclockwise direction (Figs. 1 and 2), so that the feeding carriage is pushed toward the left in these figures, to a position in which it receives a fresh supply of fuel, due to the leftward movement of the upright wall 64 to a position beneath the lower edge of the left-hand hopper wall 15, and the discharge of fuel from surface 65 onto surface 63, and from surface 63 onto the top of the dome. These movements comprise a relative change from full-line to dotted-line position in Figs. 1 and 2.

Ultimately, this movement of the pusher plate 50 terminates, when the pin 83 has been shifted by shaft 75 to the extreme limit of stroke. The pin 83 then is given a quick movement with substantially no resistance opposed thereto, amounting to substantially half a revolution of the shaft 75, as a result of which the pusher plate 50 is moved back to the full-line position of Fig. 1, along with the fingers 44; and simultaneously the feeding carriage is moved to the right in Figs. 1 and 2, so that any fuel in front of the wall 62 is pushed into the supply channel, and falls downward so that it comes to rest either upon the upper surface of the top wall 50c of the pusher plate or falls directly into the fire pot, behind the mass of fuel already in the latter. As the pusher plate 50 continues its rapid clockwise movement (Fig. 1) into the full-line position, any fuel which has come upon the top wall 50c is immediately stripped therefrom by the lower edge of the channel wall 52, so that it also falls into the fire pot. Thus, at the completion of this quick movement of the parts, a fresh supply of fuel is introduced into the fire pot at a position immediately in front of the pusher plate 50. It is preferred, particularly when distillable fuels such as bituminous coal are being utilized, to so proportion the parts that the pusher plate 50 in its retracting movement leaves a space which receives the quantity of fuel delivered as an increment to the contents of the fire pot; as in this way the channel by which fuel moves from the magazine into the fire pot is free of fuel, and the distillation occurs in the fire bed itself. Hence, a better control of evolved matters is attained in the stove when so operated.

When the pin 83 has completed this movement, it again exerts an effort upon the link 84 tending to move the rod 38 and the pusher plate 50 again in the relatively counterclockwise direction of Figs. 1 and 2. This movement of the pusher plate, however, is again resisted by the presence of the fuel in the fire pot, and hence the pusher plate 50 can only move in proportion as the fuel is consumed. Thus, the presence of the material in the fire pot may be regarded as constituting a congestion, whereby a control of the pressure plate 50 is attained. In this illustrative form, the torque exerted upon the pressure plate 50 is substantially constant, and hence there is being exerted a substantially constant controlling effect through this congestion throughout the stroke of movement of the pusher plate 50. The shape of this pusher plate may advantageously have the form shown, so that a component of downward effort is being exerted against the fuel at the top of the fire bed.

Further, the shape of the pusher plate and its position at the forward end of its travel provides a shaping of the material already present in the fire pot, so that this material does not crumble and fall into the space cleared by the pusher plate 50 in its return movement.

Any clinkers which may form adjacent the fire bars 35 are being acted upon by fuel located behind these clinkers, that is to say, between the clinkers and the lower edge of the pusher plate 50, and hence as upper parts of the fuel bed burn away, this constant torque effect at the rod 38 results in a considerable pressure being exerted at the lower edge of the pusher plate 50, as this edge is close to the axis of the rod 38, and hence the clinkers are being continually advanced downward along the fire bars 35, as there are no structures along these fire bars which interrupt such movement. Hence, these clinkers are broken or pushed along until they are definitely discharged at the lower ends of the fire bars 35.

The link 87 is shown as having a slot for receiving the pin on the arm 88. In this form, the counterweight 89 is operating to close the gate, and hence the lost motion connection provided by the pin and slot permits the gate to remain open in the event that a large clinker or other accumulation should become caught between the fingers 44 of the gate and the lower or discharge end of the grate bars 35. By construction and arrangement, the discharge at the gate is proportioned to be less than the amount of fuel fed by the synchronized structures, for each operation of the parts.

This operation continues in cycle, with the feeding of fresh coal at each return movement of the pusher plate 50, and with a forward movement of the pusher plate 50 determined by the presence of the material in the fire box, and in proportion to the combustion occurring.

It is preferred to have all walls and joints tightly sealed, so that air may only enter at the desired points and in the desired amount. For maintaining a draft, it is preferred, in this illustrative form, to provide an air damper 100 which is mounted by a pivot 101 opposite a suitable air opening, and being controlled by the piston 102 of a thermostatic bellows 103, this bellows being actuated through a conduit 104 from a thermostatically sensitive bulb 105 which may be located in the water storage tank WT which is connected to the water connections 25 and 26, in the usual way.

It has been found that ordinary leaks through the casing and at crevices in the structure are then insufficient to maintain the combustion during idling, and therefore an adjustment 100t is provided for holding the damper 100 slightly open even under an idling condition.

When distillable fuel such as bituminous coal is being employed, it is found advantageous to provide secondary air openings 105a. These openings are illustrated as located above the space occupied by each fresh increment of fuel when introduced. Thus, as the fuel is distilled, its gases and possible soot are evolved beneath the baffle 27 and are guided by the matter over the incandescent portion of the fuel bed. The secondary air admitted is thus caused to mix with these gases and the soot immediately as evolved, and hence a definite combustion is accomplished before escape to the flue 29. Hence, the furnace does not smoke even at the moments of introducing fuels which are rich in volatiles, and the maximum efficiency of heat production is attained. It will particularly be noted that the pusher member 50, during the course of its forward movement, sweeps past the openings 105a and successively shuts them off, so that there is a successive reduction in the addition of this secondary air in proportion as the fresh fuel is being distilled away by heat transferred thereto from the fire pot, and in proportion as the pusher plate 50 moves. It will be understood that the openings 105a may be omitted when fuels having substantially no volatiles, such as anthracite coal, are being employed.

Further, it is desirable, when employing bituminous coal, for example, to provide other openings above the fire bed, such as the openings 31a in the fire door 31. These openings are advantageous in assuring a supply of "top air," even during idling conditions of the furnace. The openings 31a may be regulated by a damper 31b according to the particular coal being employed; and it will be noted that this adjustment may be effected once for all with a particular type of coal. When non-distilling fuels such as anthracite are employed, the damper 31b may be closed, or the openings 31a may be omitted.

It has been found that a desirable size for heating water provides a capacity of four or five pounds of coal in the fire pot, and with the variation of the quantity of fuel in the fire pot never exceeding a pound, under the various conditions of operation of the structure; and that a wholly uniform operation can be produced when the quantity delivered for each feeding operation is about one pound. As stated above, it is preferred that the quantity delivered for each such feeding increment shall occupy the space left free by the pusher member 50 in its return from its forward position into its rearward position. Since the pressure of a predetermined amount of fuel in the fire pot is being employed for determining the feeding of fresh fuel, and since the pressure plate operates to advance the material in the fire pot, a coal bed of uniform depth is easily maintained. It is desirable to provide an ash pan 17 having a capacity sufficient to receive the ash from the fuel contents of the magazine and fire pot, and then the device will operate without attention over a considerable period of time, as it is only necessary to remove ash each time that the magazine is filled. This further assures regularity of operation, as the desired type of draft can normally be assured between the feeding operations.

In a particular structure, it was found that less than twenty inch-pounds torque is sufficient for maintaining the proper rate of movement of the pusher plate. Since the automatic controlling system is being attained by a congestion principle, it is undesirable to have an excessive torque.

When the automatic control shuts off the damper 100, the device becomes sealed except for openings 31a and 105a if provided with the structure, and the consumption of fuel is extremely low. A fire can then be maintained, under idling conditions, for many hours, and yet is capable of immediate resumption of operation when the control operates to admit further air of combustion. Under full load, part load, or idling condition, the pusher plate operates, and is controlled by the quantity of fuel in the fire pot structure, so that the consumption occurs throughout under the regulated conditions as aforesaid.

It has been found advantageous to employ a small passage 107 between the supply channel and the upper arch of the dome structure, particularly when distillable fuels are being utilized, in order to assure that gases are drawn to the chimney rather than permitted to pass into the magazine and escape into the apartment. It will be noted that it is preferred to have the supply channel free of fuel, except during the actual feeding periods, in order that there may be no material therein which is susceptible of distillation.

Figure 7:
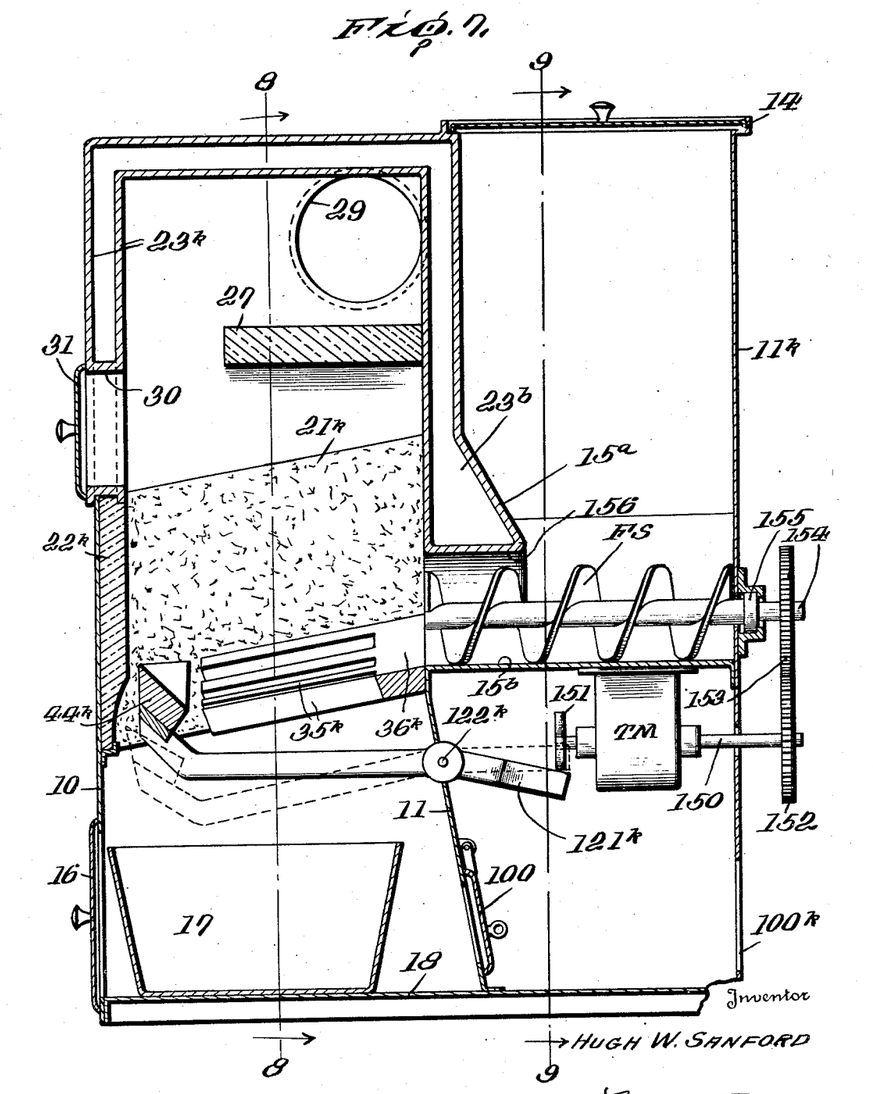
Figure 8:
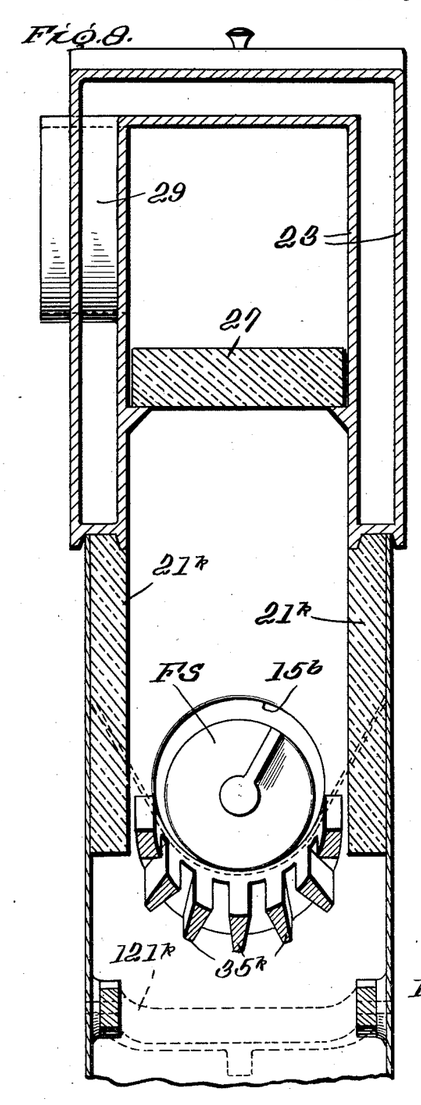
Figure 9:
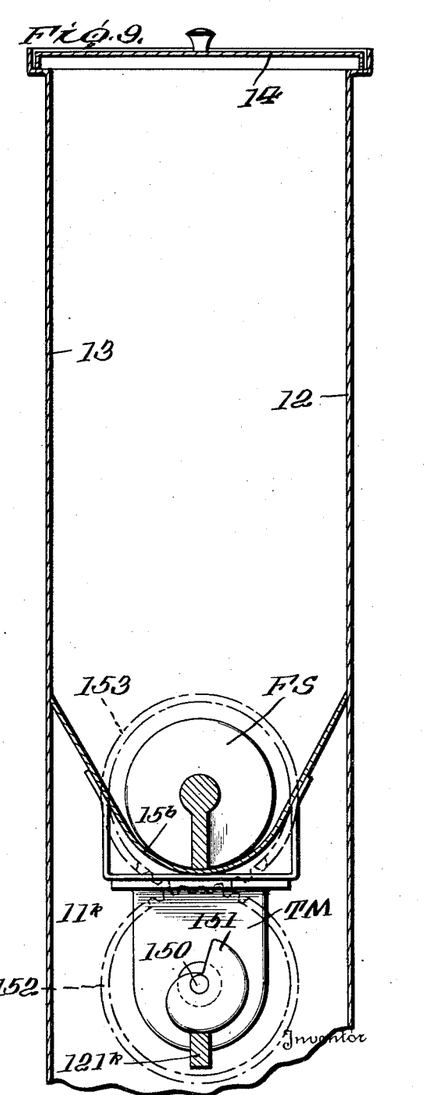

In the modified form of construction shown by Figs. 7, 8 and 9, a screw type of feed is employed, and the magazine is located relatively behind instead of above the furnace structure. The parts are again enclosed within casing walls, the walls 10 and 11 again defining at their bottoms an ash pit space, while the wall 11k is added to provide the extreme rear of the structure. The hopper or magazine is provided between the casing side walls 12, 13, the rear wall 11k, and a lower hopper wall 15b having an arcuate portion. A surface 15a is also provided on the outer of the two spaced jacket walls which provide the water space for the water heater.

A bracket on the wall 15b supports an electric motor TM which is of torque type; that is, it is capable of maintaining a substantially constant torque at all speeds, and is capable of stalling without physical damage thereto. The torque motor M has a shaft 150 to which is fixed a cam 151 and also a gear 152. The gear 152 is in mesh with a further gear 153 mounted on a shaft 154 which is supported by a bearing 155 carried on the casing wall 11k; this bearing may be of self-sealed anti-friction type as it is substantially protected against heating effects from the fire. The shaft 154 is connected with a feeding screw FS, this screw resting in and closely contacting the wall 15b for its length, and extending through an opening 156 formed by portions of the dome wall and the wall 15b. It will be noted (Fig. 7) that it is preferred to enlarge the water space immediately around this opening to provide a large space 23b into which the incoming cold water may be brought, whereby to provide an adequate heat insulation between the fire and the contents of the magazine or hopper, and to prevent the fire burning back so far as to prevent the proper feeding action in the screw.

The fire chamber construction includes the refractory side walls 21k and the refractory end wall 22k, as well as the grate bars 35k which are connected together by a web structure 36k, preferably by integrally casting therewith. It will be noted that the grate bars themselves are arranged along an arc (Fig. 8), this arc substantially corresponding to the shape of the opening 156 through which the fuel is fed to the basket provided by the grate bars.

The cam 151, as shown in Fig. 9, has a gradual increase of effective diameter substantially throughout a complete revolution, with a permitted quick relative inward movement of the cooperative lever 121k, so that the latter rocks clockwise slowly and counterclockwise quickly. This lever 121k is mounted on a pivot 122k of the fixed structure, and extends through the wall 11 in closely sealed relation thereto, and includes a gate structure 44k positioned opposite the ends of the grate bars 35k in the space between them and the end wall 22k.

In this form, it is preferred to provide the damper 100 in the wall 11, between the ash pit space and the space beneath the hopper wall 15b, and a hole 100k is provided in the wall 11k through which air may move toward the damper opening.

In operation, the hopper or magazine is filled with fuel such as coal, a fire is built in the fire pot, and current applied to the torque motor TM. The torque motor causes the shaft 150 to rotate, and the feed screw FS is driven to move fuel forward from the bottom of the hopper space, so that it passes into the fire pot. The fire is thus maintained, and the limited torque applied to the feed screw FS maintains a substantially uniform level of fresh fuel and burning coals within the fire pot. As the fuel burns away, the ash is dropped through the spaces between the grate bars 35k, and the feed screw operates to cause the advancement of a corresponding quantity of fresh fuel. If the damper 100 is completely closed, the rate of combustion is restricted, and hence the congestion in the fire pot creates a back pressure or resistance at the feed screw FS, and the torque motor TM is brought substantially to a standstill: and, in general, the fuel is fed at the rate required for supplying the fire at the particular rate of combustion.

At each revolution of the shaft 150, in this illustrated form, the cam 151 slowly and gradually raises the gate 44k from the dotted-line position to the full-line position. Finally, after the part of the cam 151 which has the maximum diameter moves past the end of lever 121k, the latter is released and then rocks by reason of the greater weight of its left-hand portion, with the weight of material thereon, from the full-line into the dotted-line position. This dropping then permits the discharge of larger particles of ash or clinker; this operation being accomplished intermittently and in substantial proportion to the rate at which the fuel is burnt.

Figure 10:
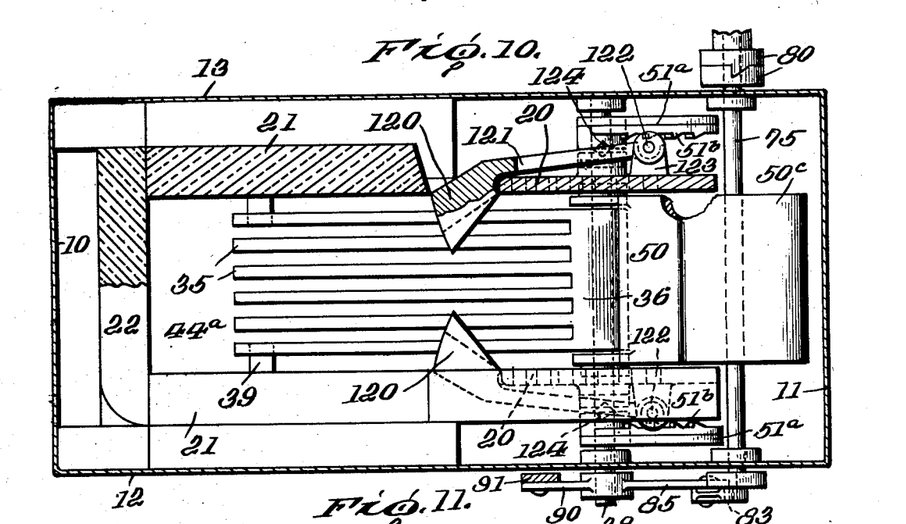
Figures 10 and 11 are fragmentary sectional views, corresponding to Fig. 6 and to a part of Fig. 1, respectively, of a further modification of construction.
Figure 11:
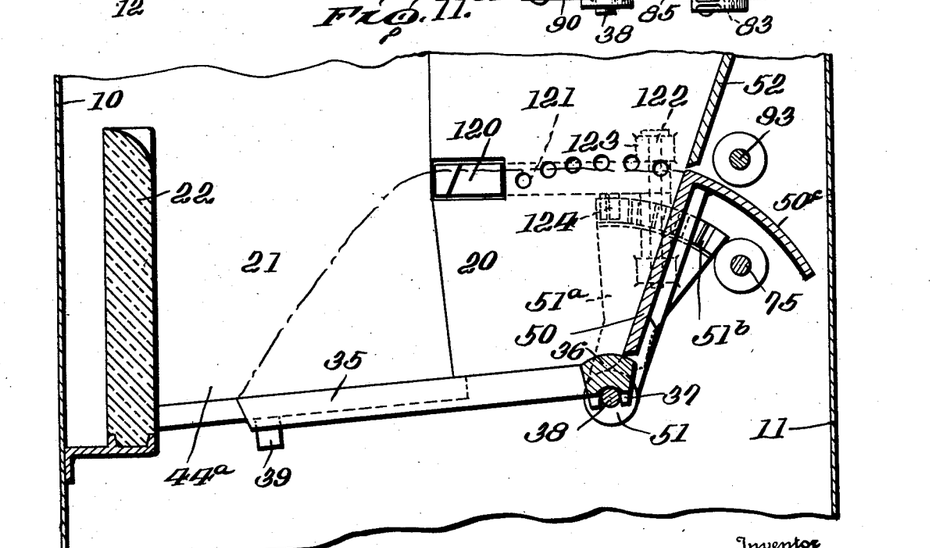

In Figs. 10 and 11 is shown another modified form of construction, in which the presence of the material in the fire box operates to produce a lateral braking or pressure effect upon the pusher plate. In this structure, the fire pot is formed substantially as in Figs. 1–6, but as a matter of further illustration, the fire bars 35 lead to an open space 44a, through which clinkers and large ash particles may be discharged into the ash pan. The rod 38 is connected to a pusher plate 50 as before, this pusher plate having the wall 50c for presentation beneath the supply channel which includes the wall 52. In this form, however, side structures 51a connected to the rod 38 are provided with tooth-equipped sectors 51b. The side walls 21 of the fire pot have apertures through which extend the noses 120 of levers 121 which are mounted on pivot rods 122 received by the ears 123 on the side wall structures 20. The levers 121 have the blocking lugs 124 for engaging the teeth 51c. It will be noted that the noses 120 are designed to be operated either by relative upward pressure of coal against them, or by lateral pressure thereon, so that they are sensitive and easily respond when pressures are transmitted to them through the body of the fuel which is present.

In operation, the fuel is supplied as before during the return or clockwise movement (Fig. 1) of the pusher plate 50, and the latter then begins its forward or counterclockwise movement. The movement of the fuel produced by the pressure plate 50 causes it to advance between the noses 120 and produce by the lifting and/or spreading effect of the fuel, a separating or outward movement of the levers 121, about the pivots 122, and causing the lugs 124 to move toward the sectors 51b and engage teeth on these sectors, thus stopping the forward movement of the pressure plate 50 until sufficient fuel has burnt away to permit the inward movement of the noses 120 again. It will be noted that the teeth in the sector 51b are so formed that they cause a relative inward movement of the noses 120, thus tending to restore the parts to a position in which the pusher plate 50 can make a further forward movement.

In this form, also, it will be noted, the presence of a predetermined quantity of material in the fire box establishes an automatic control over the movement of the pusher plate which advances the fuel into and through the fire pot.

Figure 12:
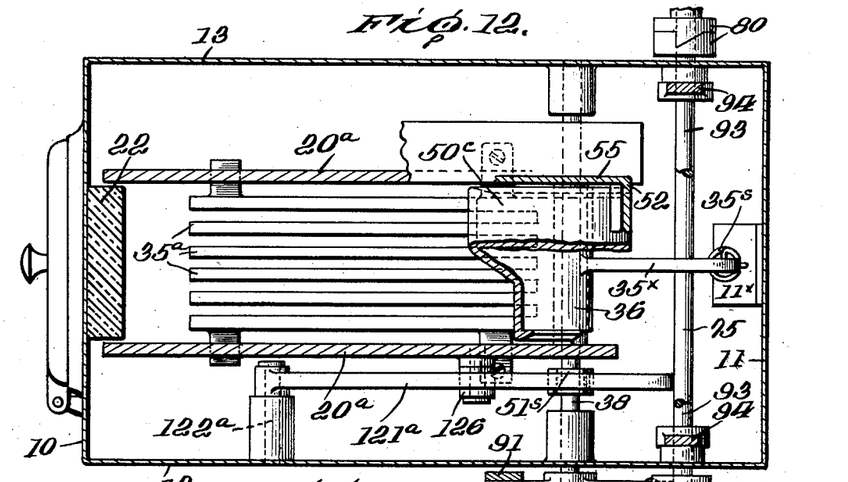
Figures 12 and 13 are similar fragmentary sectional views, of a further modification.
Figure 13:
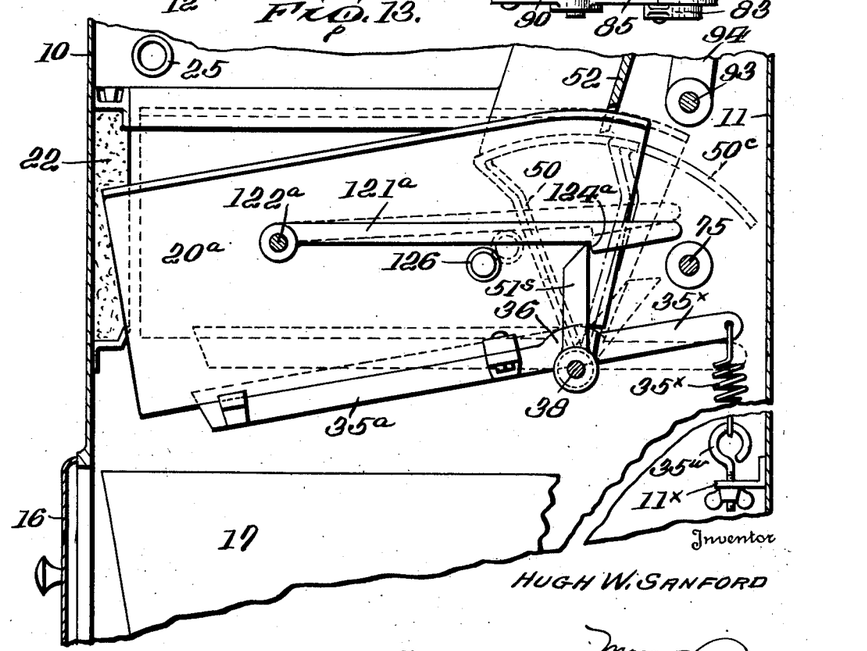

In the form of construction shown in Figs. 12 and 13, the fire pot comprises the fire bars 35a which are supported by side walls 20a, and this fire pot assembly is mounted for rocking movement about the axis of the rod 38, being provided with a lever extension 35x which is joined to a coil spring 35s having an adjustable connection by an eye bolt 35w to a bracket 11x on the rear wall 11 of the stove. The adjustment is effected so that the fire pot will tip when a predetermined weight of material is present therein.

In this form of construction, the pusher plate 50 has the top wall 50c as before, located in association with the supply channel having a wall 52. The rod structure 38 is here provided with the upwardly extending latch arm 51s. A latch lever 121a is mounted by a pivot 122a on the side wall of the stove. The lever 121a has a shoulder 124a to engage the latch arm 51s. An operating member 126, preferably of roller type, is fixed to the side of the pivoted fire pot assembly.

In this type of construction, when the fire pot and its lading lose weight by reason of combustion of fuel matter therein, the spring 35s operates and causes the pivoted fire pot structure to rock in a clockwise direction about the axis of rod 38, from the full-line position to the dotted-line position. At the completion of the prior forward movement of the pusher plate 50, the latch arm 51s has raised the latch lever 121a and has been thereafter held thereby as shown by full lines of Fig. 13. The rocking movement of the fire pot assembly, however, causes the operating member 126 to engage the latch arm 121a and raise it, so that the forces acting upon the pivot 38 are now effective to quickly return the pusher plate 50 in a clockwise direction with the rod 38, so that the fresh supply of fuel is fed into the fire pot; and to cause a return counterclockwise movement of this pusher plate, which may be blocked in part under the congestion principle described above. This return movement may progress to completion while the pivoted fire pot assembly rocks about its axis into the full-line position shown in Fig. 13. In either case, the latch arm 51s ultimately comes beneath the latch lever 121a, and the former latching relation is re-established in the event that the predetermined weight of material has been introduced into the fire pot. Obviously, this cycle will continue in proportion as demanded by the consumption of fuel.

The various forms therefore provide a furnace in which uniformity of combustion may be maintained, by providing a fuel bed of substantially constant depth, so that the fuel level remains substantially uniform, and the feeding of fuel is controlled by the amount of material (comprising combustible fuel and ash) already present in the fire pot. Thus, by providing a control structure, so that, for example, the supply of combustion air is regulated in accordance with the heat demand, an automatic operation is assured for a time determined by the quantity of fuel available in the magazine. A high efficiency of heating is attained during the period when a maximum supply of air is admitted, and the least feasible combustion occurs during the idling period when no heat is being demanded.

It is obvious that the invention may be practiced in many other ways within the scope of the appended claims.

I claim:

1. A furnace comprising a fire pot including a fuel supporting portion having a receiving end and a discharge end, means for feeding fuel onto said portion, a fuel advancing element movable at variable speeds depending upon and responsive to the rate of combustion of fuel in the fire pot for advancing fuel along said supporting portion from end to end whereby clinkers can be eliminated at said discharge end, means for resisting free movement of a fuel mass along said supporting portion thereby to provide fuel mass congestion in said fire pot, power applying means and driving connections between said power applying means and said element so constructed and cooperatively arranged as to be constantly tending to impart fuel advancing movement to said element and completely stallable or subject to having its speed of action retarded by density of the fuel and ash mass engaged by said element, whereby fuel advancing movement of the element and the speed thereof are directly responsive to fuel and ash mass congestion determined by the rate of combustion of fuel.

2. A furnace comprising a fire pot including a generally horizontally disposed fuel supporting bottom portion having a receiving end and a discharge end from which ash and clinkers can fall by gravity, a fuel advancing element for forcing fuel along and over the bottom portion, means for resisting free movement of a fuel mass along said bottom thereby to provide fuel mass congestion in said fire pot, and stallable power applying means so constructed and cooperatively arranged as to be active for constantly exerting on said advancing element a force tending to move it in the fuel advancing direction and stallable by a congestion pressure of a predetermined maximum value exerted horizontally in a fuel mass supported on said bottom but instantly effective to impart fuel advancing movement to said element each instant that said congestion pressure falls below said predetermined maximum as a result of combustion of fuel in said mass, thereby to slowly and steadily advance fuel through the fire pot in direct response to the rate of combustion of fuel in said fire pot.

3. In a furnace, a fire box having a fuel supporting portion disposed generally horizontally and having an open solid fuel receiving end and an open ash and clinker discharge end, means for feeding solid fuel into the receiving end, a reciprocable pusher engageable with the fuel mass in the box for pushing fuel toward the discharge end, means for resisting discharging movement of fuel at said discharge end, and stallable power applying means and driving connections operatively connecting the same with said pusher for imparting movement thereto, said power applying means and said driving connections being so constructed and cooperatively arranged as to render the pusher stallable by a predetermined maximum of fuel mass congestion during at least a portion of the pushing stroke of the pusher and effective to impart fuel pushing movement each time combustion of fuel of the mass results in relief of congestion below said predetermined maximum, thereby to advance fuel in the fire box in direct response to the rate of combustion of fuel in said fire box.

4. A furnace comprising a fire pot, from which clinkers can fall by gravity, including a fuel supporting portion disposed generally horizontally and having a receiving end and a discharge end, means for feeding fuel onto said portion, a pusher movable forwardly and backwardly with relation to said portion and effective during forward movements for advancing fuel over said portion from end to end whereby clinkers can be eliminated from the fire pot through said discharge end, means for resisting free movement of a fuel mass along said supporting portion thereby to provide fuel mass congestion in said fire pot, and stallable power applying means and driving connections between said power applying means and said pusher so constructed and cooperatively arranged as to be operable for applying force to said pusher tending to move the same and advance fuel and stallable by a predetermined maximum of fuel mass resistance in the fire pot during at least a part of each forward movement imparted thereby to the pusher but effective for moving the pusher and advancing fuel each time combustion of fuel reduces said amount of material and reduces the fuel mass resistance below said predetermined maximum whereby the rate of advancement of the fuel will be controlled in direct response to the rate of combustion of fuel in the fire pot.

5. The combination of a fire box providing a combustion zone and a power-operated stoking mechanism for solid fuel, means for resisting movement of fuel through said combustion zone, said stoking mechanism including a pusher, and stallable power applying means and driving connections operatively connecting the same with the pusher and constructed and cooperatively arranged for cyclically moving the pusher to urge its forward face forwardly into the combustion zone of said fire box under substantially continuously applied force and then automatically retract said face when the forward movement has carried it to a predetermined forward point, the stallable force applied by said stallable power applying means and connections being so limited during at least part of the forward movement of said face that at a certain stage of congestion of fuel in the fire box the forward movement of the said face is stalled and is kept stalled until such time as the resistance of the congested fuel to the forward pressure of the face is sufficiently reduced as by combustion of fuel or ash removal to permit forward movement of said face to automatically restart and continue in similar stallable fashion until the face has reached said predetermined forward position by successive stages of stalling and forward movement.

6. In a furnace of the character described, a fire pot, means opposing movement of fuel through said pot, a reciprocable pusher member for advancing fuel in the fire pot, pusher member operating means connected with said pusher member and so constructed and arranged as to be stallable by resistance set up by a predetermined fuel mass density intervening the pusher member and said movement opposing means and automatically effective for fuel advancing purposes each time combustion of fuel reduces the density of the fuel mass below said predetermined density, and means including a gravity drop guide within the casing for feeding fuel to a position between the fuel already in the fire pot and said member when the latter is in withdrawn position, said pusher member including a portion effective to close said chute on each forward stroke of said pusher member and for opening said drop guide on each withdrawal stroke of said pusher member.

7. In a furnace, a fire box for solid fuels and having a receiving end and a discharge end, a reciprocable pusher for advancing fuel in said fire box, means for resisting free movement of a fuel mass in said fire box thereby to provide fuel mass congestion in said fire box, a fuel magazine having a fuel receptacle and a passageway leading from said receptacle to a place above said receiving end whereby fuel may drop by gravity through empty space into the fire box directly into said receiving end in front of said pusher, stallable power applying means and driving connections operatively connecting the same with said pusher so constructed and cooperatively arranged as to be effective for advancing said pusher stallably in direct response to the rate of combustion of fuel in the fire box during at least part of its forward stroke movement and for automatically retracting it when it has reached a certain forward position whereby an empty fuel receiving space is created in the combustion zone of the fire box forwardly of said pusher, and fuel feeding means operable during a retraction of the pusher for transferring a volume of fresh fuel always less than the volume necessary to fill said empty space forwardly of said pusher from the magazine receptacle to a point where gravity causes it to descend into said space forwardly of the pusher.

8. A furnace comprising a fire pot, from which clinkers can fall by gravity, including a fuel supporting portion disposed generally horizontally and having a receiving end and a discharge end, a pusher movable forwardly and backwardly with relation to said portion and effective during forward movements for slowly and steadily advancing the fuel over said portion from end to end whereby clinkers can be eliminated from the fire pot through said discharge end, means for resisting free movement of a fuel mass in said fire pot thereby to provide fuel mass congestion in said fire pot, power applying means and driving connections between said power applying means and said pusher for imparting movement to said pusher and so constructed and cooperatively arranged as to render the pusher stallable by resistance of a substantially predetermined amount of material in the fire pot during at least a portion of the forward movement of said pusher and effective during said forward movement portion for fuel advancing purposes each time combustion of fuel reduces said amount of material for controlling the rate of advancement of the fuel in accordance with the rate of combustion of fuel in said fire pot, and means coordinated with said power applying means for intermittently supplying definite amounts of fuel onto said fuel supporting portion in advance of said pusher when the amount of material on said portion falls to a predetermined minimum.

9. In a furnace, a longitudinal fuel mass supporting bottom on which fuel is burned, means for confining a fuel mass on said bottom so as to provide fuel mass congestion variable in accordance with the rate of combustion of the fuel, a pusher movable relatively to said bottom and engageable with a fuel mass on said bottom for advancing fuel thereon and withdrawable from mass engagement for providing a fresh fuel receiving space between the pusher member and said mass, means for delivering a quantity of fresh fuel into said space when the pusher is withdrawn, and power applying means and driving connections between said power applying means and the pusher member so constructed and cooperatively arranged as to be constantly active tending to impart fuel advancing or pusher member withdrawing movement to said pusher member but stallable by a fuel mass resistance against movement of the pusher in the fuel feeding direction, whereby each time fuel mass resistance falls below said predetermined maximum due to combustion of fuel, said pusher will be moved to advance fuel along said surface until the resulting movement of fuel in advance of said pusher serves to densify the fuel mass sufficiently to reestablish said predetermined maximum resistance and again stall said power applying means.

10. A furnace comprising a longitudinal fire pot; means for confining a fuel mass in the fire pot thereby to provide fuel mass congestion variable in accordance with the rate of combustion of the fuel; a reciprocable fuel pusher member operable at one end of the fire pot for pushing fuel along said fire pot; a fuel magazine; means for preparing and delivering definite amounts of fuel from said magazine into said one end of the fire pot; a power applying means and driving connections between said power applying means and the pusher member so constructed and cooperatively arranged as to be constantly active tending to impart movement to said pusher member but stallable by a predetermined maximum of fuel mass resistance in the fuel pot; means connecting said fuel preparing and delivering means with said driving connections for causing the fuel preparing and delivering means to move in timed relation with the pusher member whereby one said definite amount of fuel is delivered into the fire pot each time the pusher member is retracted from engagement with the fuel mass therein; and means for guiding the delivered fuel into the space between the retracted pusher member and the mass already present in the fire pot; said stallable power means being effective to move the pusher and fuel before it during the portion of fuel pusher movement toward said fuel mass only when the rate of fuel combustion in the fire pot reduces the mass resistance therein below said predetermined maximum.

11. A furnace having a fire box for burning solid fuels and including a fuel supporting bottom, closure wall-structures rising above said bottom, a fuel receiving end and an ash and clinker discharging end, a fuel magazine having a discharge portion from which fuel is delivered downwardly into said receiving end, fuel-feeding means for delivering measured charges of fuel from the fuel magazine through said discharge portion, means for resisting discharging movement of fuel at said discharge end, a pusher disposed at said receiving end and having a forward face lying above said bottom and which serves as a portion of the closure wall-structures of the fire box, and stallable power applying means operatively connected with said pusher and adapted for moving said pusher through a definite forward and backward cycle of motion relative to the said bottom whereby fuel in front of the said pusher face may be pushed endwise toward said discharging end, said power means being stallable by a predetermined maximum of fuel mass resistance in the fire box during at least part of the fuel pushing movement of the pusher whereby it is automatically stalled whenever said predetermined maximum resistance to the endwise movement of the fuel in the firebox has been built by fuel-congestion in the fire box in advance of said pusher face, and said power means being effective to move said pusher and push fuel in front of it endwise along the said bottom whenever during said forward part of the cycle of movement of said pusher its stallable power is not completely counteracted by the said endwise resistance of the said fuel congested in the fire box, and means operatively connecting said power applying means with said fuel feeding means for causing said fuel feeding means and said pusher to operate in timed relationship during each said cycle whereby a measured quantity of fuel will be fed into the fire box only when said pusher face is retracted to leave an empty space between it and the fuel mass on said bottom of larger volume than the volume of said measured quantity of fuel.

12. An automatic furnace including a bottom portion for receiving a fire bed, spaced upright walls extending upward from the bottom portion, a cyclically movable member having a face for engaging fuel in the fire bed and effective for advancing the same along the bottom portion, said face substantially closing the space between and to the full depth of said walls and above the bottom portion, means including a stallable power applicator for cyclically moving said member and enabling said member to move slowly under control of fuel mass resistance in the fuel advancing direction and more rapidly in the opposite direction, and means for preparing and delivering fuel in predetermined amounts onto the bottom portion at a point thereof immediately in front of said member, said preparing means being constructed and arranged for operation by said moving means so that the fuel is delivered to the bottom portion only when the member has moved to clear a space for it whereby the building up of fuel on the bottom plate to a height where it might be deposited on the top surfaces of said member when the said member is advancing into the fuel is avoided.

13. An automatic furnace including a bottom portion for receiving a fire bed, with an ash discharge at one end of said bottom portion, a cyclically movable member forming the other end of the furnace fire box and having a face for engaging fuel in the fire bed and effective for advancing the same along the bottom portion, means for cyclically moving said member for advancing the fuel and for retracting the member into retracted position, and means operated by said moving means in synchronism with the movable member for introducing fresh fuel behind the fuel already in the fire bed and in front of the said member only when the latter has moved to clear a space for it, the member being constructed and arranged so that the upper portion of said face has a lesser angle to the horizontal than the lower portion thereof when the member is in its most advanced position whereby the member shapes the fuel already in the fire bed immediately prior to its own return movement in order to provide the space for receiving the fresh charge of fuel and to compact the fuel already present so that it will not move into said space during the retraction of said member.

14. An automatic furnace comprising a furnace structure including a substantially horizontal bottom portion and having a discharge at one end of said bottom portion, a rockable element located at the opposite end of the bottom portion and effective during forward movement to advance the material on the bottom portion along the same toward the discharge, said element being constructed and arranged to shape the said material on the bottom portion during said forward movement so that during the backward movement the fuel mass will not crumble and a free space is established between the element and the said material, said space extending from the bottom portion to the top of the fire bed on said bottom portion, means for supplying fresh fuel into said space including a feeder structure for preparing substantially pre-determined charges of fuel and a chute separate from the fire box for carrying the prepared quantity by gravity into said space, and power-driven means for cyclically moving said element and said feeder device whereby a fuel charge is gravitationally delivered each time the element has been moved to clear a space for said fuel.

15. A furnace having a fire pot providing a combustion zone for solid fuel and including a longitudinal fuel supporting bottom having a fuel receiving end and an ash and clinker discharging end, two side walls, and an end wall adjacent said discharging end and resisting free movement of fuel through said combustion zone; a fuel receptacle containing a supply of fresh fuel and disposed above the horizontal level of the combustion zone and including a fuel discharging and guiding portion disposed to deliver fresh fuel into the receiving end of the fire pot; a reciprocable pusher operable at the receiving end of the pot and adapted when retracted to provide a fresh fuel charge receiving space for receiving fresh fuel from said guiding portion in advance thereof and when advanced in the fire pot to force the fuel before it along said bottom, fuel feeding means for delivering measured charges of fuel from the receptacle through said guiding portion, power applying means for operating the pusher and the fuel feeding means synchronously so that fuel charges are delivered through the guiding portion only when the pusher is retracted, and a power actuated discharge gate for ashes and clinkers disposed at the discharge end of said bottom.

16. A furnace structure as defined in claim 15, in which means is included for synchronizing the discharge gate movements with the cycle of movement of said pusher whereby the gate opens to discharge ashes and clinkers while advancing movement is being imparted to said pusher thereby to at least in part relieve congestion in the fuel mass in advance of said pusher.

17. A furnace structure as defined in claim 15, in which said power applying means includes a stallable motor and driving connections between said motor and said pusher so constructed and cooperatively arranged as to render the pusher stallable by a predetermined maximum of fuel mass resistance during at least a part of the forward stroke of the pusher whereby said pusher is effective for fuel mass moving purposes in direct response to the rate of fuel combustion in the fire pot.

18. In a furnace, a casing, a fire pot open at one end for ash and clinker discharging purposes and including a grate forming bottom and upstanding side walls, means mounting said fire pot for movement upwardly or downwardly accordingly as the fuel mass on said bottom varies below or above a predetermined weight due to fuel combustion or feeding on of new fuel, a cyclically operable reciprocable pusher in the other end of the fire pot for advancing fuel into and along said fire pot, power operated means for moving said fuel advancing means, means for charging fuel into the fire pot in advance of the pusher each time it is retracted, and control means within said casing and actuated by movement of the fire pot for automatically initiating movement of said pusher each time reduction of fuel mass weight due to combustion of fuel in the fire pot causes the fire pot to rise to a predetermined elevation.

19. In a furnace, a casing, a fire pot open at one end for ash and clinker discharging purposes and including a grate forming bottom and upstanding side walls, means mounting said fire pot for movement upwardly or downwardly accordingly as the fuel mass on said bottom varies below or above a predetermined weight due to fuel combustion or feeding on of new fuel, a cyclically operable reciprocable pusher in the other end of the fire pot for advancing fuel into and along said fire pot, power operated means for moving said fuel advancing means, means for charging fuel into the fire pot in advance of the pusher each time it is retracted, and control means within said casing and actuated by movement of the fire pot for automatically initiating movement of said pusher each time reduction of fuel mass weight due to combustion of fuel in the fire pot causes the fire pot to rise to a predetermined elevation, said fire pot and said pusher being swingably mounted on a common fulcrum.

20. In a furnace, a casing, a fire pot open at one end for ash and clinker discharging purposes and including a grate forming bottom and upstanding side walls, means mounting said fire pot for movement upwardly or downwardly accordingly as the fuel mass on said bottom varies below or above a predetermined weight due to fuel combustion or feeding on of new fuel, a cyclically operable reciprocable pusher in the other end of the fire pot for advancing fuel into and along said fire pot, power operated means for moving said fuel advancing means, means for charging fuel into the fire pot in advance of the pusher each time it is retracted, and control means within said casing and actuated by movement of the fire pot for automatically initiating movement of said pusher each time reduction of fuel mass weight due to combustion of fuel in the fire pot causes the fire pot to rise to a predetermined elevation, said fire pot and said pusher being swingably mounted on a common fulcrum, and said control means including a pusher movement preventing latch arm movable with the pusher, a latch lever mounted within the casing and engageable with the latch arm for securing it against movement, and a latch lever tripping member movable with the fire pot within said casing.

21. In a furnace, a fire pot open at one end for ash and clinker discharging purposes and including a grate forming bottom, means mounting said fire pot for movement upwardly or downwardly accordingly as the fuel mass on said bottom varies below or above a predetermined weight due to fuel combustion or feeding on of new fuel, a cyclically operable reciprocable pusher in the other end of the fire pot for advancing fuel into and along said fire pot, power operated means for moving said fuel advancing means, means for charging fuel into the fire pot in advance of the pusher each time it is retracted, and control means actuated by movement of the fire pot for automatically initiating movement of said pusher each time reduction of fuel mass weight due to combustion of fuel in the fire pot causes the fire pot to rise to a predetermined elevation, said power applying means being stallable by a predetermined amount of fuel mass congestion in the fuel advancing portion of its cycle of movement and effective each time combustion of fuel reduces congestion below said predetermined amount, but not to a degree sufficient to cause the fire pot to rise, to advance fuel before it responsive to the rate of said combustion.

22. A furnace comprising a fire pot including a fuel supporting bottom portion having a discharge end from which clinkers can fall by gravity, means for confining a fuel mass on said bottom so as to provide fuel mass congestion variable in accordance with the rate of combustion of the fuel, a discharge gate at one end of the bottom and normally disposed to prevent discharging of ash or clinkers from said bottom, means for supplying fresh fuel at the other end of the bottom, a pusher for advancing the fuel along said bottom, a motor and means connecting it with said pusher so constructed and cooperatively arranged as to be constantly active tending to impart movement to said pusher and stallable by fuel mass resistance above a predetermined maximum but effective to push the pusher and the fuel before it whenever combustion of fuel reduces the mass resistance below said predetermined maximum whereby the rate of advancement of fuel by said pusher is directly responsive to the rate of combustion of the fuel on said bottom, and means for imparting movement to said gate to facilitate discharge of ash and clinkers therethrough.

23. An automatic furnace for distillable solid fuel, including a fire box, means for feeding fuel thereto, said fire box being provided with draft openings for the supply of combustion air to the fuel, and also having secondary openings for delivering secondary air above the fuel for combustion of the distillate gases, said furnace including means for reducing the admission of secondary air substantially in proportion to the amount of freshly supplied fuel burned in the fire box and the consequent reduction of production of distillate gases.

24. An automatic furnace for distillable solid fuel including a fire box, means for intermittently admitting fuel to a part of the fire box, means for moving the admitted fuel to another part of the fire box to prepare for the introduction of a fresh quantity of fuel, said fire box being provided with draft openings for the supply of combustion air to the fuel, and also having secondary openings for delivering secondary air above the fuel, said furnace also including means for gradually restricting the admission of secondary air as freshly supplied fuel is burned and the production of distillate gases gradually ceases.

25. An automatic furnace for distillable solid fuel including a fire box, means for advancing fuel into and through the fire box, said fuel-advancing means including a pusher member which moves back and forth, said fire box being provided with draft openings for the supply of combustion air to the fuel and also having secondary openings for delivering secondary air into the fire box above the fuel, said pusher member being effective during forward movement to obstruct the openings for successively reducing the delivery of secondary air, and means for actuating said fuel-advancing means.

26. An automatic furnace for distillable solid fuel, including a fire box, a baffle wall above the fire box, an outlet flue, means for feeding fuel into the fire box at a point adjacent the baffle wall, said fire box being provided with draft openings for the supply of combustion air to the fuel and also having secondary openings for delivering secondary air into the space between the top of the fuel bed and the baffle for combustion of the distillate gases during their movement from the fresh fuel to the outlet flue, said furnace including means for controlling the admission of secondary air substantially in proportion to the amount of freshly supplied fuel burned in the fire box and the consequent production of distillate gases.

27. An automatic furnace for distillable solid fuel including a fire box, means for advancing fuel into and through the fire box and including a pusher member which moves back and forth, the fire box including a baffle above the fuel bed extending from the fuel inlet end thereof for causing the matters evolved by fresh fuel to pass toward and over an incandescent portion of the fuel bed, said fire box also including passage means for the admission of secondary air into the space between the fuel bed and baffle at points adjacent the fuel inlet end, said pusher member being effective during forward movement to successively reduce the delivery of secondary air, and means for actuating said fuel-advancing means.

HUGH W. SANFORD.